United States Patent Office 2,734,331
Patented Feb. 14, 1956

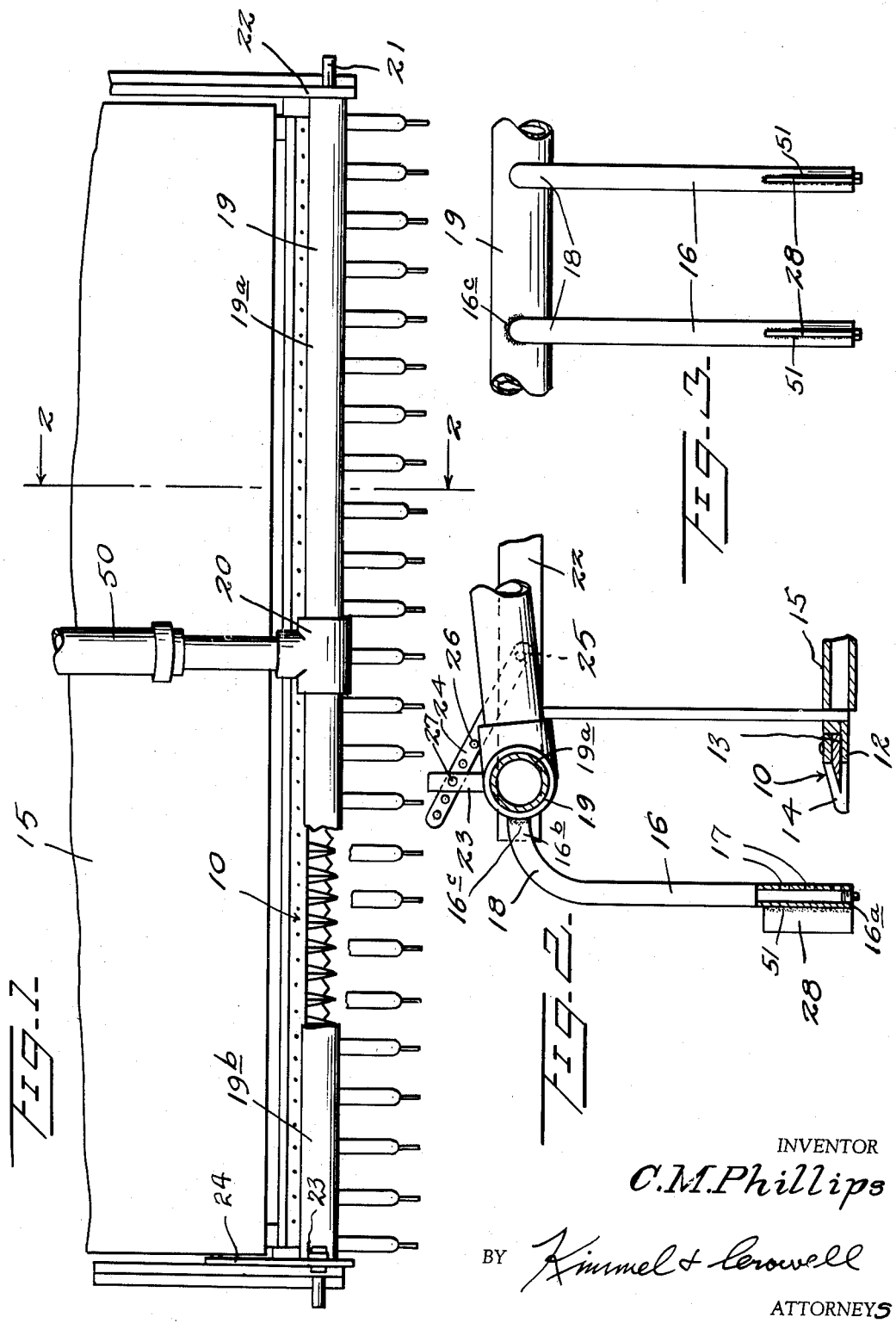

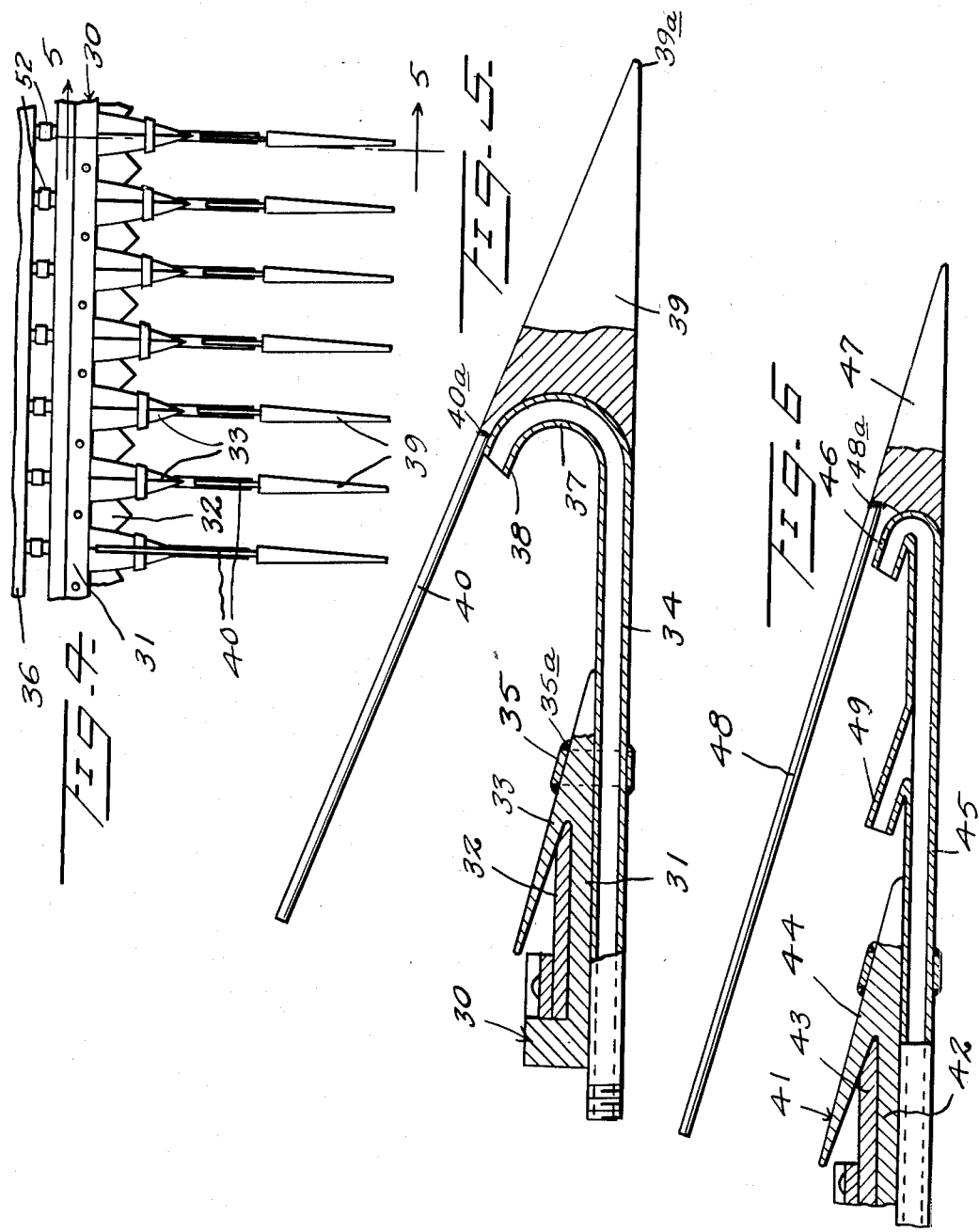

2,734,331

ATTACHMENT FOR GRAIN HARVESTING MACHINE

Curt M. Phillips, Rudyard, Mont.

Application July 6, 1953, Serial No. 366,171

4 Claims. (Cl. 56—296)

This invention relates to grain harvesting machines, and is a continuation-in-part of my co-pending application, Serial Number 255,159, filed November 7, 1951, now issued as Patent No. 2,670,586, for Attachment for Grain Harvesting Machines.

An object of this invention is to provide, in combination with the grain harvesting machine, a means disposed in advance of the cutter bar which is adapted to force the grain rearwardly into the cutter and onto the platform or conveyor which is at the rear of the cutter bar.

Another object of this invention is to provide an attachment of this kind which includes a divider blade for dividing the grain in advance of the cutter bar so that the grain will be in a fairly upright position for engagement with the cutter bar.

In a modified form of this invention, the stationary cutter bar with the guard fingers has secured thereto means for forcing the grain and straw rearwardly over the cutter bar and onto the platform or conveyor.

With the above and other objects in view, my invention consists in the arrangement, combination and details of construction disclosed in the drawings and specification, and then more particularly pointed out in the appended claims.

In the drawings:

Figure 1 is a fragmentary plan view of a harvesting machine showing the grain cutter bar and a platform or conveyor with an attachment constructed according to an embodiment of this invention.

Figure 2 is an enlarged fragmentary sectional view taken on the line 2—2 of Figure 1.

Figure 3 is an enlarged fragmentary front elevation of a portion of the attachment.

Figure 4 is an enlarged fragmentary plan view of a modified form of this invention with certain elements broken away.

Figure 5 is an enlarged sectional view taken on the line 5—5 of Figure 4.

Figure 6 is an enlarged vertical section similar to Figure 5 showing another modified form of this invention.

Referring to the drawings and first to Figures 1, 2 and 3, the numeral 10 designates generally a conventional cutter for cutting standing grain. The cutter 10 is formed of a stationary cutter bar 12 with a movable cutter bar 13, and the stationary cutter bar 12 also includes a plurality of guard members 14 which project forwardly.

The machine herein disclosed also includes a platform or conveyor 15 which is disposed at the rear of the cutter bar 10 and onto which the cut grain is adapted to engage for movement to the succeeding station of the harvesting machine.

In order to provide a means whereby the grain will be forcibly moved rearwardly onto the platform 15, I have provided a plurality of vertically disposed tubes 16 which are positioned forwardly of the cutter bar 10. The tubes 16 are provided adjacent the lower end 16a thereof with a series of vertically spaced apart air discharge or jet openings 17. The upper end 16b of each tube 16 is bent rearwardly as indicated at 18 and the upper rear end 16b of the bent portion 18 is fixed as by welding 16c to and communicates with a horizontally disposed manifold 19. The manifold 19 as herein disclosed is formed of two sections 19a and 19b with a T connection 20 connected therebetween.

The opposite ends of the manifold 19 have secured thereto a pair of studs 21 which rockably engage in bearings and supporting bars 22 which project forwardly from the harvesting machine. One end of the manifold 19 has extending upwardly therefrom a lever 23 and a link 24 is pivotally secured to the support member 22, as indicated at 25, and link 24 is provided with a series of openings 26 through which a bolt 27 engages. The lever 23 with the pivot link 24 provides a means whereby the air discharge tubes 16 may be angularly adjusted with respect to the vertical.

Each discharge tube 16 has secured as by welding 51 to the lower end 16a thereof a forwardly projecting blade 28 which is adapted to divide the stalks of grain and prevent clogging of the grain prior to the engagement of the stalks with the cutter bar 10.

Referring now to Figures 4 and 5, there is disclosed a modified form of this invention embodying a cutter bar 30 which is formed of a stationary cutter bar 31 and a movable cutter member 32. The stationary bar 31 includes a plurality of forwardly projecting guards or fingers 33. In order to provide a means whereby the grain may be forced rearwardly over the cutter bar or member 30, I have provided a horizontally disposed air discharge pipe 34 which is fixed to the lower side of the stationary cutter bar 31 being secured thereto by means of a strap or band 35 which is welded as at 35a or otherwise secured to the forward portion of each guard or finger 33 and also to the pipe 34.

The rear end of the pipe 34 is adapted to be connected to a manifold or air supply pipe 36 by couplings 52. The forward end of the pipe 34 is bent reversely as indicated at 37 and the terminal end of the bent portion 37 forms an upwardly and rearwardly directed air discharge nozzle 38. The nozzle 38 is inclined rearwardly and upwardly so as to blow the grain rearwardly over the cutter member 30 and onto the platform which is positioned rearwardly of the cutter member 30. The bent portion 37 of the pipe 34 has fixed thereto, as by welding or the like, a forwardly projecting tapering guard finger 39. This guard finger 39 is substantially triangular in side elevation with the small or pointed end 39a thereof foremost as shown in Figure 5.

An upwardly and rearwardly inclined bar or rod 40 is fixed as by welding 40a to the guard member or finger 39 and is inclined in the same direction and at the same angle as the nozzle 38. The rod or bar 40 provides a means whereby grain stalks which are not standing upright will be held in a substantially upright position prior to contact of the stalks with the cutter member 30. In Figure 4 the rod 40 at the left of this figure is shown in full length, whereas the remaining rods are broken away.

Referring now to Figure 6, there is disclosed a further modification of this invention wherein the cutter member 41 is of conventional construction and includes a stationary cutter bar 42, and a movable cutter bar 43. The stationary cutter bar 42 also includes a plurality of forwardly projecting tapering guard members 44. A horizontally disposed air conductor pipe 45 is fixed to the lower side of the stationary cutter bar 42 and projects forwardly of each finger 44. The pipe 45 at its forward end is provided with a rearwardly directed nozzle 46 and a guard member 47 of forwardly tapering construction is fixed to and projects forwardly from the nozzle 46.

An upwardly and rearwardly inclined guard bar or rod 48 is fixed as by welding 48a to the guard member or finger 47 and is inclined upwardly and rearwardly at substantially the same angle as the angle of projection of the air from nozzle 46. A rear jet nozzle 49 extends from the pipe 45 rearwardly of the nozzle 46 and is inclined at substantially the same angle as the inclination of nozzle 46. Nozzle 49 is disposed closely adjacent the forward ends of the guard fingers 44 and provides a second stream of air for blowing the stalks or straw with the grain rearwardly over the cutter bar 41.

In the use and operation of this attachment, referring first to Figures 1, 2 and 3, the manifold 19 is secured to the harvesting machine by the supporting bars 22 and the T connection 20 is connected to a flexible supply tube 50 so that manifold 19 can be angularly adjusted to dispose the air discharge tubes 16 at the desired angle with respect to the vertical. The tubes 16 with the guard blades 28 will divide the grain prior to contact of the grain with the cutter member 10 and the grain will be blown rearwardly onto the cutter member 10 and after being cut by the cutter 10 the stalks and the grain will be blown rearwardly onto the platform 15.

The attachment shown in Figures 4, 5 and 6 will operate similar to the one shown in Figures 1, 2 and 3 with the exception that the air discharge nozzle 38 and 46 are fixed, as by welding, to the stationary cutter bars. The attachment hereinbefore described will provide a means whereby the bent stalks of grain will be partially raised upwardly so that they can be cut by the cutter bar and after the stalks and the grain have been cut, the material is then blown rearwardly onto the platform or conveyor.

What is claimed is:

1. In a grain harvesting machine having a cutter bar formed of a stationary cutter bar, a cutter bar mounted for reciprocation above said stationary bar, forwardly projecting guard members carried by said stationary bar, a pipe fixed beneath said stationary bar and projecting forwardly of each guard member, and upwardly and rearwardly directed air nozzle carried by the forward end of said pipe, a tapered guard fixed to and extending from the forward end of said pipe, and an upwardly and rearwardly directed bar fixed to and extending rearwardly from said tapered guard.

2. In a grain harvesting machine having a cutter bar formed of a stationary cutter bar, a cutter bar mounted for reciprocation above said stationary bar, forwardly projecting guard members carried by said stationary bar, a pipe fixed beneath said stationary bar and projecting forwardly of each guard member, an upwardly and rearwardly directed air nozzle carried by the forward end of said pipe, a tapered guard fixed to and extending from the forward end of said pipe, an upwardly and rearwardly directed bar fixed to and extending rearwardly from said tapered guard, and an intermediate nozzle carried by said pipe between said first nozzle and said guard member.

3. In a grain harvester having a stationary cutter bar, a cutter bar mounted for reciprocation above said stationary cutter bar and forwardly projecting guard members carried by said stationary cutter bar, means for pneumatically forcing the material rearwardly over the cutter bars, said means comprising an air conducting pipe extending under said stationary cutter bar and secured to and beneath each of said guard members, and an upwardly and rearwardly directed discharge nozzle carried by the forward end of each pipe, and a guide rod fixed relative to said nozzle and inclined upwardly and rearwardly therefrom.

4. In a grain harvester having a stationary cutter bar, a cutter bar mounted for reciprocation above said stationary cutter bar and forwardly projecting guard members carried by said stationary cutter bar, means for pneumatically forcing the material rearwardly over the cutter bars, said means comprising an air conducting pipe extending under said stationary cutter bar and secured to and beneath each guard member, a reverted nozzle carried by said pipe, a forwardly extending guard member fixed to each nozzle, and a guide rod fixed relative to said latter named guard member and projecting rearwardly and upwardly therefrom, the upper rear end of said guard rod substantially overlying said cutter bars.

References Cited in the file of this patent

UNITED STATES PATENTS

| | | |
|---|---|---|
| 689,800 | Hafermehl | Dec. 24, 1901 |
| 859,602 | Green | July 9, 1907 |
| 1,122,375 | Engle | Dec. 29, 1914 |
| 1,794,658 | Walsh | Mar. 3, 1931 |
| 1,900,269 | Altgelt et al. | Mar. 7, 1933 |